(12) United States Patent
Tomita et al.

(10) Patent No.: US 8,475,906 B2
(45) Date of Patent: Jul. 2, 2013

(54) SILICON CARBIDE BASED POROUS MATERIAL AND METHOD FOR PREPARATION THEREOF

(75) Inventors: Takahiro Tomita, Chita (JP); Kenji Morimoto, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 1076 days.

(21) Appl. No.: 12/325,080

(22) Filed: Nov. 28, 2008

(65) Prior Publication Data

US 2009/0176043 A1 Jul. 9, 2009

(30) Foreign Application Priority Data

Nov. 30, 2007 (JP) ................................ 2007-309967
Nov. 26, 2008 (JP) ................................ 2008-300742

(51) Int. Cl.
*C04B 35/00* (2006.01)

(52) U.S. Cl.
USPC ................ 428/116; 264/628; 501/88; 501/92

(58) Field of Classification Search
USPC 428/116; 501/88, 92; 523/523, 524; 264/628
See application file for complete search history.

(56) References Cited

U.S. PATENT DOCUMENTS

| | | | | |
|---|---|---|---|---|
| 4,559,244 A | * | 12/1985 | Kasprzyk et al. | 501/82 |
| 4,560,478 A | * | 12/1985 | Narumiya | 55/523 |
| 5,474,587 A | | 12/1995 | Dias et al. | |
| 7,316,722 B2 | * | 1/2008 | Komori et al. | 55/523 |
| 2005/0020431 A1 | | 1/2005 | Tani | |
| 2005/0209088 A1 | | 9/2005 | Tani | |
| 2007/0032370 A1 | * | 2/2007 | Weisensel et al. | 501/88 |
| 2007/0032371 A1 | | 2/2007 | Tani | |
| 2009/0173050 A1 | | 7/2009 | Travitzky et al. | |

FOREIGN PATENT DOCUMENTS

| | | |
|---|---|---|
| EP | 1 550 646 A1 | 7/2005 |
| EP | 1 741 687 A1 | 1/2007 |
| JP | A-04-187578 | 7/1992 |
| JP | A-6-182228 | 7/1994 |
| JP | A-07-330462 | 12/1995 |
| JP | B2-8-10621 | 1/1996 |
| JP | A-2004-059361 | 2/2004 |
| JP | B2-3699992 | 9/2005 |
| WO | WO 2007/003428 A1 | 1/2007 |

OTHER PUBLICATIONS

European Search Report issued in European Application No. 08253846.3 mailed on Aug. 12, 2010.
Jun. 8, 2012 Office Action issued in European Application No. 08 253 846.3.

* cited by examiner

*Primary Examiner* — Archene A Turner
(74) *Attorney, Agent, or Firm* — Oliff & Berridge, PLC

(57) ABSTRACT

A silicon carbide based porous material, which contains a metal silicide in an amount of 1 to 30% by mass and having a porosity of 38 to 80%, is provided.

16 Claims, 2 Drawing Sheets

SILICON CARBIDE BASED POROUS MATERIAL AND METHOD FOR PREPARATION THEREOF

BACKGROUND OF THE INVENTION AND RELATED ART

The present invention relates to a silicon carbide based porous material and a honeycomb structure both suitable for use, for example, as a filter for purification of diesel exhaust gas, as well as to a method for preparing a silicon carbide based porous material.

BACKGROUND ART

A honeycomb structure is in wide use as a capturing filter for exhaust gas, for example, as a diesel particulate filter (DPF) used for capturing and removing the particulate contained in an exhaust gas emitted from a diesel engine and the like.

In such a honeycomb structure, a plurality of cells which act as a fluid passage, are formed by being divided by porous partition walls made of, for example, silicon carbide (SiC) and are arranged in parallel to the central axis of the honeycomb structure. Cells adjacent to each other are plugged alternately (in checkered flag pattern) at the ends; that is, a cell is open at one end and is plugged at other end, and cells adjacent to the cell are plugged at one ends and are open at other ends. By employing such a constitution, an exhaust gas which enters a predetermined cell (gas-incoming cell) from its one end, is passed through porous partition walls and is discharged via adjacent cells (gas-outgoing cells), whereby the particulate contained in the exhaust gas is captured by the partition walls during the passage of the exhaust gas therethrough and the exhaust gas can be purified.

As a specific relevant technique on a structure composed of silicon carbide, there is disclosed a porous silicon carbide based catalyst carrier of honeycomb structure which is obtained by forming a starting material (a silicon carbide powder having a predetermined specific surface area and a predetermined impurity content) into a required shape, drying the molded body, and firing the dried molded body in a temperature range of 1,600 to 2,200° C. (see, for example, Patent Document 1).

[Patent Document 1] JP-A-1994-182228
[Patent Document 2] JP-B-1996-10621
[Patent Document 3] JP 3699992 B2

SUMMARY OF THE INVENTION

In the sintering form (necking) caused by the recrystallization of silicon carbide per se, disclosed in the Patent Document 1, silicon carbide is vaporized from the surfaces of silicon carbide particles and condenses on the particle-to-particle contact areas (necks), inviting the growth of necks and forming a bound state. However, the vaporization of silicon carbide requires a very high firing temperature, which has incurred a high cost; moreover, a material of high thermal expansion coefficient need be fired at a high temperature, which has resulted in reduction in firing yield.

On the other hand, there is disclosed a ceramic-made heater made of a porous silicon carbide sintered material which contains a nickel silicide alloy in the grain boundaries (see, for example, Patent Document 2). However, in the preparation method described in the Patent Document 2, the silicon carbide sintered material obtained has a porosity of about 35%; therefore, the silicon carbide sintered material is insufficient for use as a filter of higher gas permeability. Further, the silicon carbide sintered material need be prepared by firing at a high temperature of around 2,000° C., which has posed problems in cost and production yield.

In order to provide a structural material of higher porosity, there is disclosed a silicon carbide based porous structural material having a porosity of 95 to 97%, which is obtained by firing a sponge-like porous structure made of, for example, a resin impregnated with a slurry containing silicon and a carbon source (see, for example, Patent Document 3). The porous structural material disclosed in the Patent Document 3 has excellent gas permeability owing to the high porosity; however, it has a problem of insufficient strength owing to too high porosity.

The present invention has been made in view of the above-mentioned problems of conventional art and aims at providing a silicon carbide based porous material and a honeycomb structure, both of which have a high porosity and yet a high strength, have a high thermal conductivity and excellent thermal shock resistance, and can be prepared by sintering at a relatively low temperature, and a method for easy preparation of a silicon carbide based porous material.

The present inventors made a study in order to achieve the above aim and, as a result, found that the above aim could be achieved by allowing the intended product to contain a metal silicide in a predetermined proportion. The finding has led to the completion of the present invention.

The present invention provides a silicon carbide based porous material, a honeycomb structure and a method for preparing a silicon carbide based porous material, all described below.

[1] A silicon carbide based porous material containing a metal silicide in an amount of 1 to 30% by mass and having a porosity of 38 to 80%.

[2] The silicon carbide based porous material according to [1], which contains silicon carbide as the main component and wherein all of the silicon carbide is β-SiC.

[3] The silicon carbide based porous material according to [1], which contains α-SiC and β-SiC and wherein the proportion of the β-SiC to the total of the α-SiC and the β-SiC is 5 to 100% by mass.

[4] The silicon carbide based porous material according to [2] or [3], wherein at least part of the β-SiC is particles having a particle diameter of 0.5 μm or more.

[5] The silicon carbide based porous material according to any of [1] to [4], which has a gas permeability coefficient of $1 \times 10^{-13}$ to $1 \times 10^{-10}$ m$^2$.

[6] The silicon carbide based porous material according to any of [1] to [5], wherein the metal silicide is nickel silicide.

[7] The silicon carbide based porous material according to [6], wherein the nickel silicide is represented by a chemical formula of NiSi$_2$.

[8] The silicon carbide based porous material according to any of [1] to [7], which has a thermal conductivity of 10 to 50 W/mK.

[9] A honeycomb structure made of a silicon carbide based porous material according to any of [1] to [8], which has a plurality of cells formed by being divided by partition walls.

[10] The honeycomb structure according to [9], which is used as a filter for purification of diesel exhaust gas.

[11] The honeycomb structure according to [10], which is made by bonding a plurality of honeycomb segments having said cells and wherein each cell is plugged at either end so that the cells look like being plugged alternately, at each end face of the honeycomb structure.

[12] A method for preparation of a silicon carbide based porous material, which comprises forming a raw materials mixture containing a metal, silicon and carbon, into a predetermined shape, followed by calcination and firing, to obtain a silicon carbide based porous material containing a metal silicide in an amount of 1 to 30% by mass and a having a porosity of 38 to 80%.

[13] The method for preparation of a silicon carbide based porous material according to [12], wherein the raw materials mixture further contains an α-SiC raw material.

[14] The method for preparation of a silicon carbide based porous material according to [12] or [13], wherein the firing is conducted at 1,250 to 1,800° C.

[15] The method for preparation of a silicon carbide based porous material according to [13] or [14], wherein the α-SiC raw material has an average particle diameter of 5 to 100 μm.

[16] The method for preparation of a silicon carbide based porous material according to any of [12] to [15], wherein the raw materials mixture is formed into a honeycomb shape having a plurality of cells divided by partition walls.

The silicon carbide based porous material of the present invention has a high porosity and yet a high strength, has a high thermal conductivity and excellent thermal shock resistance, and can be produced by sintering at a relatively low temperature.

The honeycomb structure of the present invention has a high porosity and yet a high strength, has a high thermal conductivity and excellent thermal shock resistance, and can be produced by sintering at a relatively low temperature. Therefore, the honeycomb structure of the present invention is suitably used, for example, as a filter (DPF) for purification of diesel exhaust gas.

The method for preparing a silicon carbide based porous material, according to the present invention enables easy production of a silicon carbide based porous material high in porosity and yet in strength, high in thermal conductivity and excellent in thermal shock resistance, by sintering at a relatively low temperature.

Figure 1:
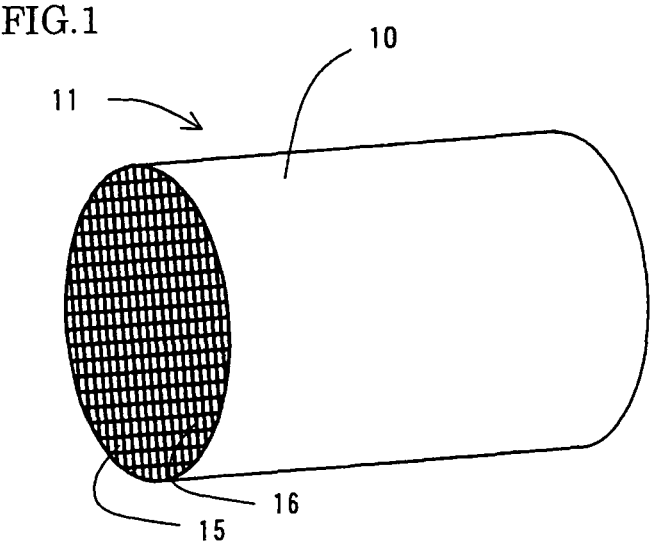
FIG. 1 is a perspective view showing an embodiment of the honeycomb structure of the present invention.

EXPLANATION OF NUMERALS 1 and 11 are each a honeycomb structure; 2 is a honeycomb segment; 4 is a coating material; 5 and 15 are each a cell; 6 and 16 are each a partition wall; 7 is a plugging material; 9 is a bonding material layer; and 10 is an outer wall.

DESCRIPTION OF THE PREFERRED EMBODIMENTS

The preferred embodiments for carrying out the present invention are described below. However, the present invention is not restricted to the following embodiments and it should be construed that there are also included, in the present invention, those embodiments in which appropriate changes, improvements, etc. have been made to the following embodiments based on the ordinary knowledge possessed by those skilled in the art, as long as there is no deviation from the gist of the present invention.

1. Silicon Carbide Based Porous Material

An embodiment of the silicon carbide based porous material of the present invention contains a metal silicide in an amount of 1 to 30% by mass and has a porosity of 30 to 80%. The detail thereof is described below.

The metal silicide is a reaction product between a metal and silicon (Si). The silicon carbide based porous material of the present invention contains the metal silicide in a predetermined proportion and therefore is high in thermal conductivity and excellent in thermal shock resistance. Further, when the silicon carbide based porous material of the present invention is produced according to the method described later, it is presumed that the metal acts on a reaction between silicon and carbon for formation of silicon carbide and gives an influence on the particle diameter, shape, etc. of the silicon carbide formed. Consequently, it is considered that the silicon carbide based porous material having a pore structure of high pore continuity.

The lower limit of the proportion of the metal silicide contained in the silicon carbide based porous material of the present invention is 1% by mass, preferably 2% by mass, further preferably 3% by mass when the whole amount of the silicon carbide based porous material is taken as 100% by mass. The upper limit of the proportion of the metal silicide contained in the silicon carbide based porous material of the present invention is 30% by mass, preferably 25% by mass, further preferably 15% by mass when the whole amount of the silicon carbide based porous material is taken as 100% by mass. When the proportion of the metal silicide is below 1% by mass, no sufficient thermal conductivity is obtained and the improvement in thermal shock resistance is insufficient. Further, the continuity of pores is low. On the other hand, when the proportion of the metal silicide exceeds 30% by mass, the thermal expansion coefficient obtained tends to be high and the thermal shock resistance obtained is low in some cases.

As specific examples of preferred metal silicides, there can be mentioned nickel silicide, zirconium silicide, iron silicide, titanium silicide and tungsten silicide. Of these, more preferred are nickel silicide and zirconium silicide because a higher thermal conductivity can be obtained and a pore structure of high pore continuity can be obtained. Nickel silicide is particularly preferred.

The metal silicide includes compounds represented by various chemical formulas. As to nickel silicide, for example, there are compounds represented by chemical formulas such as $Ni_3Si$, $Ni_5Si_2$, $Ni_2Si$, $NiSi$, $NiSi_2$ and the like. Of these, $NiSi_2$ is preferred in view of the heat resistance. As to zirconium silicide, there are compounds represented by chemical formulas such as $Zr_3Si$, $Zr_2Si$, $Zr_5Si_3$, $Zr_3Si_2$, $Zr_5Si_4$, $Zr_6Si_5$, $ZrSi$, $ZrSi_2$ and the like. Of these, $ZrSi_2$ is preferred in view of the heat resistance.

(Silicon Carbide)

The silicon carbide based porous material of the present invention contains silicon carbide as the main component. Silicon carbide has polymorphism, i.e. a form of α-SiC and a form of β-SiC. With respect to the silicon carbide contained in the silicon carbide based porous material of the present invention, there is (1) a case in which all of the silicon carbide is β-SiC and (2) a case in which both of α-SiC and β-SiC are contained; and any case is preferred. When the silicon carbide contains both α-SiC and β-SiC (that is, the case (2)), the proportion of β-SiC to the total of α-SiC and β-SiC is preferably 5 to 100% by mass, further preferably 10 to 80% by mass, particularly preferably 15 to 50% by mass. When the proportion of β-SiC is in the above range, a sufficient strength can be obtained. Incidentally, when the proportion of β-SiC is below 5% by mass, the strength obtained tends to be insufficient.

In the silicon carbide constituting the silicon carbide based porous material of the present invention, at least part of the β-SiC is present ordinarily in a state of particles. This particle-shaped β-SiC has a particle diameter of preferably 0.5 μm or more, further preferably 1 μm or more, particularly preferably 2 μm or more. When the particle diameter of the β-SiC is more than 0.5 μm or more, a sufficient strength can be obtained. Incidentally, there is no particular restriction as to the upper limit of the particle diameter of the β-SiC, but the upper limit is 100 μm or less in view of the possibility of practical production, etc. Here, "the particle diameter of the β-SiC" referred to in the present specification is a value obtained by, in a freely selected section of the silicon carbide based porous material, observed by an electron microscope, measuring the maximum particle diameter of β-SiC (the maximum length between two points of the contour of particle image) in a visual field of a freely selected magnification (for example, a magnification of 500 or 1,000), repeating this operation a plurality of times (for example, 20 times), and dividing the total of the maximum particle diameters of β-SiC in all the visual fields, by the number of the visual fields.

(Porosity)

In producing the silicon carbide based porous material in accordance with the method described later, it is presumed that, in the reaction of silicon and carbon for formation of silicon carbide, a metal acts on the reaction and has an influence on the particle diameter, shape, etc. of the silicon carbide formed. As a result, the pores formed tend to become open pores. Further, the porosity of the porous material obtained is easily influenced by the composition of raw materials mixture (the proportion of silicon, in particular) The porosity of the silicon carbide based porous material of the present invention can be controlled in a wide range and is specifically 38 to 80%, preferably 40 to 75%, further preferably 45 to 70%. When the porosity is below 30%, the gas permeability coefficient obtained is small and the pressure loss generated by gas permeation is large. On the other hand, when the porosity exceeds 80%, the strength obtained is small. Incidentally, the "porosity" referred to in the present specification is a value obtained by measurement by the Archimedes method (based on JIS R 1634).

(Gas Permeability Coefficient)

The silicon carbide based porous material of the present invention shows a small pressure loss when a gas is allowed to permeate therethrough, and has a large gas permeability coefficient. Specifically, the gas permeability coefficient of the silicon carbide based porous material of the present invention is preferably $1 \times 10^{-13}$ to $5 \times 10^{-10}$ m$^2$, further preferably $5 \times 10^{-13}$ to $1 \times 10{-10}$ m$^2$, particularly preferably $1 \times 10^{-12}$ to $5 \times 10^{-11}$ m$^2$. When the gas permeability coefficient is below $1 \times 10^{-13}$ m$^2$, the pressure loss tends to increase. On the other hand, when the gas permeability coefficient exceeds $5 \times 10^{-10}$ m$^2$, the porosity increases as well and the strength tends to decrease.

(Thermal Conductivity)

The silicon carbide based porous material of the present invention has a high thermal conductivity because it contains a metal silicide in a given proportion, and shows excellent thermal shock resistance. Specifically, the thermal conductivity of the silicon carbide based porous material of the present invention is preferably 10 to 50 W/mK, further preferably 12 to 45 W/mK, and particularly preferably 14 to 40 W/mK. When the thermal shock resistance is less than 10 W/mK, the thermal conductivity tends to decrease. On the other hand, when the thermal conductivity exceeds 50 W/mK, there is no particular problem but such a porous material is difficult to produce practically.

2. Method for Preparation of Silicon Carbide Based Porous Material

Next, description is made on the method for preparation of a silicon carbide based porous material, according to the present invention. In an embodiment of the method for preparation of a silicon carbide based porous material, according to the present invention, a raw materials mixture containing a metal, silicon and carbon is formed into a predetermined shape, followed by calcination and firing, to obtain a silicon carbide based porous material containing a metal silicide in an amount of 1 to 30% by mass and having a porosity of 38 to 80%. The detail of the embodiment is described below.

(Metal)

The metal is a component which can react with silicon (Si) to form the metal silicide. It is presumed that, since the metal is allowed to be present in the raw materials mixture, the metal acts on the reaction of silicon and carbon for formation of silicon carbide and gives an influence on the particle diameter, shape, etc. of the silicon carbide formed. As a result, the pores formed tend to become open pores. Further, the porosity of the porous material obtained is influenced by the composition of raw materials mixture (the proportion of silicon, in particular). Therefore, the porosity of the porous material obtained can be controlled in a wide range, in the present invention method for preparation of the silicon carbide based porous material.

As to the kind of the metal, there is no particular restriction as long as the metal can react with silicon (Si) to form the metal silicide. As specific examples of preferred metals, there can be mentioned nickel (Ni), zirconium (Zr), iron (Fe), titanium (Ti), tungsten (W), and the like. Of these, preferred are nickel (Ni) and zirconium (Zr), and further preferred is nickel (Ni). These metals may be used singly or in combination of two or more kinds. Besides these single metals, there may be used metal compounds containing these metals.

The metal is used ordinarily in the form of powder (particles). When a powdery metal (a metal powder) is used, the particle diameter of the metal powder is preferably 1 to 100 μm, further preferably 4 to 80 μm, in view of the reactivity of the metal powder with silicon (Si).

(Silicon)

Silicon (Si) is a component which can react with the above-mentioned metal to form a metal silicide. As the silicon (Si), powder-shaped (particle-shaped) silicon is used ordinarily. When the powder-shaped silicon (a silicon powder) is used, the particle diameter of the silicon powder is preferably 1 to 100 μm, further preferably 3 to 80 μm in view of the reactivity of the silicon powder with the metal.

(Carbon)

Carbon (C) is a component which can react with the above-mentioned silicon (Si) to form silicon carbide. As the carbon (C), powder-shaped (particle-shaped) carbon is used ordinarily. When the powder-shaped carbon (a carbon powder) is used, the particle diameter of the carbon powder is preferably 5 nm to 50 μm, further preferably 10 nm to 30 μm in view of the reactivity of the carbon powder with the silicon (Si).

(α-SiC Raw Material)

The raw materials mixture may further contain an α-SiC raw material. As the α-SiC raw material, particle-shaped α-SiC can be used preferably. The average particle diameter of the particle-shaped α-SiC is preferably 5 to 100 μm, further preferably 10 to 80 μm. When the average particle diameter of the particle-shaped α-SiC is below 5 μm, the thermal properties, such as thermal conductivity, obtained tend to be low. On the other hand, when the average particle diameter of the particle-shaped α-SiC exceeds 100 μm, there is no particular problem but the forming of the raw materials mixture may be difficult. Incidentally, the "average particle diameter" referred to in the present specification is a value obtained by particle size distribution measurement by laser diffraction scattering method based on JIS R 1629 and is a volume-based, average particle diameter.

(Raw Materials Mixture)

As the components compounded in the raw materials mixture, there can be mentioned, besides the above-mentioned metal, silicon, carbon and α-SiC raw material, for example, an organic or inorganic binder, a pore former, a surfactant (or a dispersant), water, and the like. As specific examples of the organic or inorganic binder, there can be mentioned methyl cellulose, hydroxypropoxyl cellulose, hydroxyethyl cellulose, carboxymethyl cellulose and polyvinyl alcohol.

As specific examples of the pore former, there can be mentioned graphite, wheat flour, starch, phenolic resin, polymethyl methacrylate, polyethylene, polyethylene terephthalate, resin balloon (acrylonitrile series plastic balloon), water-adsorptive resin, and the like. As specific examples of the surfactant (or dispersant), there can be mentioned fatty acid salt, salt of alkyl sulfate, salt of polyoxyethylene alkyl ether sulfate, alkylbenzenesulfonic acid salt, alkylnaphthalenesulfonic acid salt, alkylsulfosuccinic acid salt, salt of alkyl diphenyl ether disulfonic acid, alkylphosphonic acid salt, polycarboxylic acid salt, aliphatic quaternary ammonium salt, aliphatic amine salt, polyoxyethylene alkyl ether, polyoxyethylene alcohol ether, polyoxyethylene glycerine-fatty acid ester, polyoxyethylene sorbitan (or sorbitol)-fatty acid ester, polyoxyethylene glycol-fatty acid ester, alkyl betaine, amine oxide, cationic cellulose derivative, polyethyleneimine, polycarboxylic acid salt, polyacrylic acid salt, and the like.

The raw materials mixture is mixed and kneaded to obtain a kneaded clay having plasticity, and the kneaded clay is formed into a predetermined shape to obtain a molded body.

As to the shape of molded body, there is no particular restriction and various shapes can be employed depending upon the intended application of the porous material obtained finally. However, when the porous material is used, for example, as the filter for purification of diesel exhaust gas, there is preferred a honeycomb shape having a plurality of cells divided by partition walls. In order to form the kneaded clay into such a honeycomb shape, it is preferred to employ a forming method such as extrusion and the like.

The obtained molded body is dried by an appropriate drying method and then fired, whereby a silicon carbide based porous material which is an embodiment of the present invention can be produced. There is no particular restriction as to the drying method, and a drying method using a microwave, hot air and the like is preferably used. Incidentally, the silicon carbide based porous material obtained, ordinarily contains β-SiC which is a low-temperature phase; therefore, a relatively low firing temperature can be used. Specifically, the firing temperature is preferably 1,250 to 1,800° C., further preferably 1,300 to 1,750° C., particularly preferably 1,350 to 1,700° C. When the firing temperature is below 1,250° C., the sintering does not proceed sufficiently in some cases. On the other hand, when the firing temperature exceeds 1,800° C., a special kiln is required in some cases and disadvantages tend to be incurred in cost and product yield. Incidentally, after the drying and before the firing, calcination can be conducted as necessary in order to burn and remove the organic substance (binder, dispersant, pore former, etc.) present in the molded body (the calcination is referred to also as calcination, debinder, etc.). In general, the burning temperature of organic binder is about 100 to 300° C. and the burning temperature of pore former is about 200 to 800° C.; therefore, the temperature of calcination may be about 200 to 1,000° C. As to the time of calcination, there is no particular restriction, but it is usually about 1 to 10 hours. The atmosphere of calcination can be appropriately selected from air, nitrogen, etc.

3. Honeycomb Structure

Next, description is made on the honeycomb structure of the present invention. FIG. 1 is a perspective view showing an embodiment of the honeycomb structure of the present invention. As shown in FIG. 1, the honeycomb structure 11 of the present embodiment has a plurality of cells 15 formed by being divided by porous partition walls 16. Each cell 15 acts as a passage for fluid such as gas, liquid, and the like. Incidentally, in FIG. 1, the numeral 10 indicates an outer wall of the honeycomb structure 1. The honeycomb structure 11 of the present embodiment is constituted by the above-mentioned silicon carbide based porous material. Therefore, the honeycomb structure 11 of the present embodiment has a high porosity and yet a high strength, has a high thermal conductivity, and has excellent thermal shock resistance. Further, it can be produced by sintering at a relatively low temperature.

Figure 2:
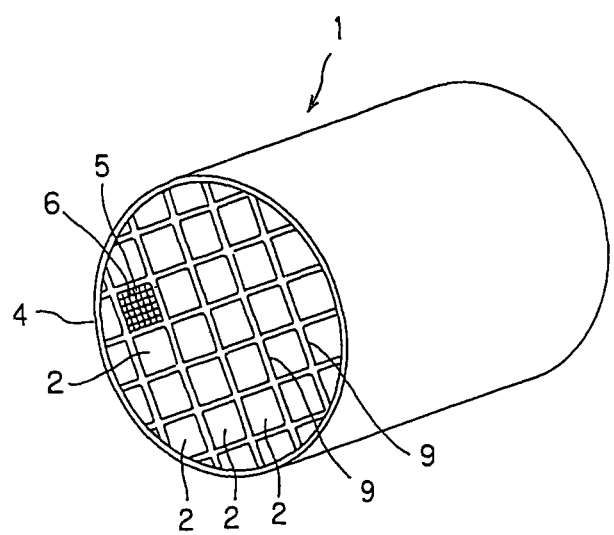
FIG. 2 is a perspective view showing other embodiment of the honeycomb structure of the present invention.
Figure 3:
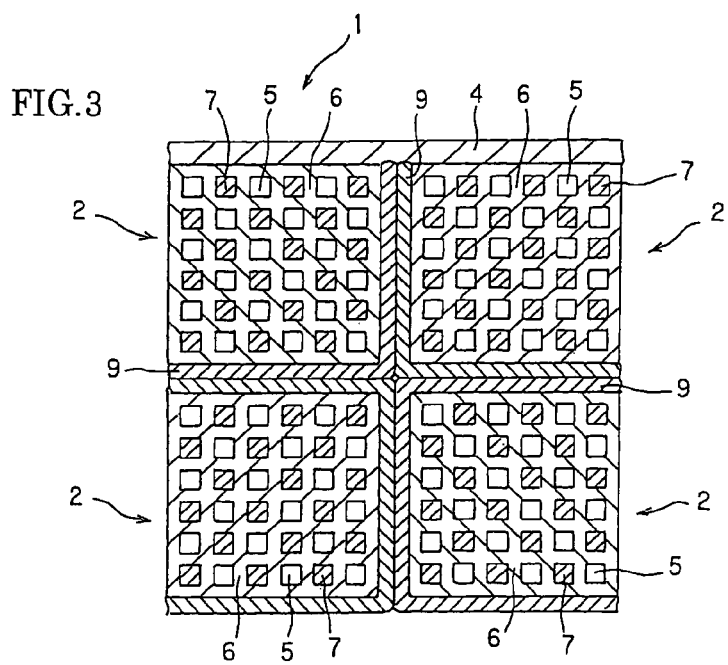
FIG. 3 is a key portion-enlarged view of the honeycomb structure shown in FIG. 2.

FIG. 2 is a perspective view showing other embodiment of the honeycomb structure of the present invention. FIG. 3 is a key portion-enlarged view of the honeycomb structure shown in FIG. 2. The honeycomb structure 1 shown in FIG. 2 and FIG. 3 is formed by bonding honeycomb segments 2 into one piece using bonding material layers 9 made of a bonding material composition. Each honeycomb segment 2 has a structure in which a plurality of cells 5 formed by being divided by porous partition walls 6 are arranged in parallel to the central axis of the honeycomb segment; each honeycomb segment 2 constitutes part of the honeycomb structure 11 and is assembled in a direction normal to the central axis of the honeycomb structure 1, whereby the honeycomb structure 1 is constituted.

The honeycomb segments 2 bonded into one piece by the bonding material layers 9 are subjected to grinding so that the overall shape of the section of bonded segments perpendicular to each passage (each cell 5) becomes a circle, an oval, a triangle, a square or other desired shape, and then covered with a coating material 4 at the outer surface. Incidentally, when the honeycomb structure 1 is used as a DPF, the cell 5 of each honeycomb segment 2 are plugged, as shown in FIG. 4, alternately at each end face of the segment 2, using a plugging material 7.

Figure 4:
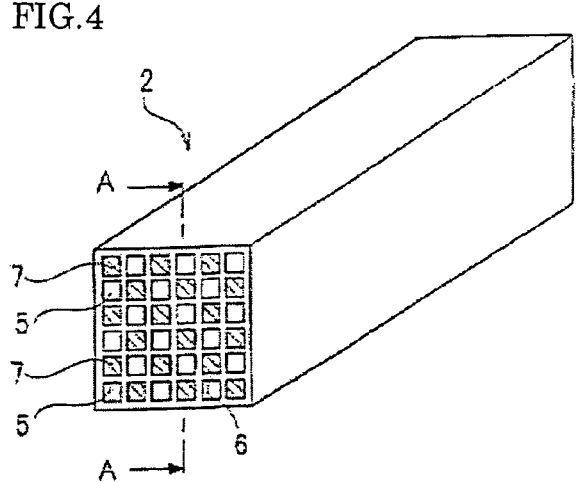
FIG. 4 is a perspective view of a honeycomb segment constituting the honeycomb structure shown in FIG. 2.
Figure 5:
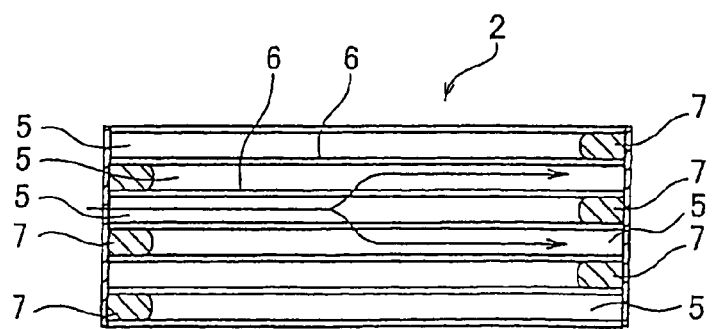
FIG. 5 is an A-A sectional view of FIG. 4.

Predetermined cells 5 (gas-incoming cells) are open at the left side ends of FIG. 4 and FIG. 5 and plugged at the right side ends by a plugging material 7. Other cells 5 (gas-outgoing cells) adjacent to the given cells 5 are plugged at the left side ends by the plugging material 7 and open at the right side ends. Such plugging allows each end face of the honeycomb segment 2 to look a checker flag pattern, as shown in FIG. 3.

FIG. 5 shows a case in which the left side of honeycomb segment 2 is an inlet of exhaust gas. The exhaust gas enters into the honeycomb segment 2 from cells 5 (gas-incoming cells) which are open and not plugged. The exhaust gas which has entered into the cells 5 (gas-incoming cells) passes through porous partition walls 6 and leaves the honeycomb segment 2 from other cells 5 (gas-outgoing cells). During the passage of the exhaust gas through the partition walls 6, soot-containing particulates present in the exhaust gas are captured by the partition walls 6. In this way, the exhaust gas can be purified. With this capturing, the soot-containing particulates accumulate inside the honeycomb segment 2 with the passage of time, resulting in an increase in pressure loss. Therefore, a regeneration treatment for burning the soot, etc. is conducted periodically. Incidentally, in FIGS. 3 to 5, there are shown honeycomb segments 2 whose overall shape of section perpendicular to the passages (cells 5) is a square; however, the sectional shape of honeycomb segment may be a triangle, a hexagon, and the like. The sectional shape of each cell 5 also may be a triangle, a hexagon, a circle, an oval, and other shape. The sectional shapes of cells 5 need not be the same and, for example, a combination of an octagon and a tetragon is a preferred embodiment. It is further preferred that the sectional shapes of gas-incoming cells are an octagon and the sectional shapes of gas-outgoing cells are a tetragon. A combination of an octagon (sectional shape of incoming cell) and a tetragon (sectional shape of outgoing cell) may result in an increase in the accumulation amount of particulates in incoming cell and, therefore, in the regeneration of filter, the particulates accumulated in a large amount are burnt, generating a large amount of heat. In such a case, therefore, the silicon carbide-based porous material of the present invention, which is high in thermal conductivity and excellent in thermal shock resistance, is highly advantageous.

As shown in FIG. 3, the bonding material layers 9 are formed by coating a bonding material composition on the outer surface of each honeycomb segment 2, and functions so as to bond adjacent honeycomb segments 2 to each other. Incidentally, as the bonding material composition, there can be preferably used a material having the same formulation as the kneaded clay used in production of the silicon carbide based porous material of the present embodiment.

The bonding material composition may be coated on the outer surface of each honeycomb segment 2 but, between two honeycomb segments 2 adjacent to each other, may be coated only on either of the two outer surfaces adjacent to each other. Such coating only on either of two adjacent outer surfaces is preferred because the use amount of the bonding material composition can be saved. As to the coating direction of the bonding material composition, there is no particular restriction and there may be adopted a lengthwise direction of the outer surface of honeycomb segment, a direction normal to the lengthwise direction of the outer surface of honeycomb segment, a direction normal to the outer surface of honeycomb segment, etc. However, coating in the lengthwise direction of the outer surface of honeycomb segment is preferred. The thickness of each bonding material layer 9 is determined in consideration of the bonding force between honeycomb segments 2, and is appropriately selected in a range of, for example, 0.5 to 3.0 mm.

As the plugging material 7 used for plugging of cells 5, the same material as the kneaded clay can be used. The plugging with the plugging material 7 can be conducted, for example, by masking not-to-be-plugged cells 5 of a honeycomb segment 2 and immersing the end face of the honeycomb segment 2 in a slurry-state plugging material, to plug the open ends of unmasked cells 5. The plugging of the plugging material 7 may be conducted before the firing conducted after the formation of honeycomb segment 2 or after the firing; however, filing before firing is preferred because the firing step is complete in one time.

After the production of honeycomb segment 2, a bonding material composition of paste form is coated on the outer surface of the honeycomb segment 2 to form a bonding material layer 9; a plurality of honeycomb segments 2 are assembled so as to obtain a desired stereo-structure (a whole structure of honeycomb structure 1); the assembly is press-bonded and then dried with heating. In this way, a bonded material of a plurality of honeycomb segments 2 is produced. Then, the bonded material is subjected to grinding into the above-mentioned shape; the ground material is coated at the outer surface with a coating material 4; then, the coated material is dried with heating. Thus, a honeycomb structure 1 shown in FIG. 2 is produced. As the material of the coating material 4, the same material as used in the bonding material layer 9 can be used. The thickness of the coating material 4 is appropriately selected in a range of, for example, 0.1 to 1.5 mm.

EXAMPLES

The present invention is described below in detail by way of examples. Note that the present invention is not limited to the following examples. The methods used for measuring and evaluating various properties were as follows.
[Average Particle Diameter of Raw Material Powder]
It was measured based on JIS R 1629.
[Particle Diameter of β-SiC Particles]
A sample obtained by cutting into a cubic shape (5×5×5 mm) was immersed in a resin and then polished. The polished surface was observed using an electron microscope at a magnification of 500 in 20 visual fields, to measure the particle diameter of the largest particle of β-SiC particles, i.e. the maximum particle diameter, in each visual field. The total of each maximum particle diameter was divided by the number (20) of visual fields and the value obtained was taken as "particle diameter of β-SiC particles".
[Identification and Quantitative Determination of Crystal Phase]
The identification and quantitative determination of each crystal phase were conducted by X-ray powder diffraction. Incidentally, the quantitative determination of SiC was carried out by the powder method of X-ray diffraction, based on the quantitative analysis described in "Advanced Silicon Carbide Ceramics", compiled by 124th Committee of High-Temperature Ceramic Material, of Japan Society for the Promotion of Science, UCHIDA ROKAKUHO (2001) p. 347-350. As to $NiS_2$ and $ZrSi_2$, whether or not the metal silicide phase was $NiS_2$ or $ZrSi_2$, was confirmed by X-ray powder diffraction; the amount of Ni or Zr was determined by chemical analysis; the amount was converted into the amount of $NiS_2$ or $ZrSi_2$ to quantitatively determine the amount of $NiS_2$ or $ZrSi_2$.
[Porosity]
It was measured according to the Archimedes method (JIS R 1634), using a sample obtained by cutting into a size of 5×5×25 mm or 0.3×30×30 mm.
[Gas Permeability Coefficient]
A sample obtained by cutting into a size of 30 (diameter)×1 mm or 0.3×30×30 mm was used. It was calculated from the following formula (2) in accordance with the DARCY'S LAW.

$$\text{Gas permeability coefficient } K = (\mu \cdot L \cdot Q)/(\Delta P \cdot A) \quad (2)$$

(In the formula (2), μ is a viscosity coefficient, L is a sample thickness, Q is a gas flow rate, ΔP is a pressure loss, and A is a sample area.)
[Thermal Conductivity]
It was measured in accordance with JIS R 1611, using a sample obtained by cutting into a size of 10 (diameter)×2 mm or 0.3×10×10 mm.

Example 1

Batch No. 1

1 part by mass of surfactant was added to 100 parts by mass of a mixture containing of 0.6% by mass of a nickel (Ni)

powder (# 350), 29.7% by mass of a silicon (Si) powder (particle diameter: 78 μm), 9.7% by mass of carbon black and 60% by mass of an α-SiC powder (particle diameter: 12 μm). Thereto was added an appropriate amount of water to obtain a raw materials mixture. The raw materials mixture was subjected to uniaxial pressing to obtain a molded body of 25×50× 10 mm. The molded body was dried at room temperature and at 120° C. to obtain a dried molded body. The dried molded body was calcinated in the air at 350° C. for 5 hours and then fired in an Ar inert atmosphere at 1,450° C. to obtain a plate-shaped, silicon carbide based porous material (Example 1). In the silicon carbide based porous material, the crystal phase of the metal silicide was one represented by a chemical formula $NiSi_2$ and its content was 1% by mass. The particle diameter of the β-SiC was 2 μm and the content of the β-SiC was 38% by mass when the total of α-SiC and β-SiC was taken as 100% by mass. Further, the silicon carbide based porous material had a porosity of 45%, a gas permeability coefficient of $0.10 \times 10^{-12}$ m², and a thermal conductivity of 30 W/mK.

Examples 2 to 16 and Comparative Examples 1 to 3

Batch Nos. 2 to 19

Plate-shaped, silicon carbide based porous materials (Examples 2 to 16 and Comparative Examples 1 to 3) were obtained in the same manner as in Example 1 except that there were used formulations shown in Table 1. In Table 2 are shown the kind and content of the metal silicide crystal phase in each silicon carbide based porous material and the particle diameter and content of the β-SiC therein. In Table 2 are further shown the porosity, gas permeability coefficient and thermal conductivity of each silicon carbide based porous material.

TABLE 1

|  | Batch No. | Metal Kind | Metal (Mass %) | Silicon (Si) (Mass %) | Carbon (C) (Mass %) | α-SiC (Mass %) | α-SiC Average particle diameter (μm) | Surfactant (Mass parts[*1]) |
|---|---|---|---|---|---|---|---|---|
| Exam. 1 | 1 | Ni | 0.6 | 29.7 | 9.7 | 60 | 12 | 1 |
| Exam. 2 | 2 | Ni | 2.9 | 27.9 | 9.2 | 60 | 12 | 1 |
| Exam. 3 | 3 | Ni | 5.4 | 26.0 | 8.6 | 60 | 12 | 1 |
| Exam. 4 | 4 | Ni | 8.2 | 39.0 | 12.8 | 40 | 12 | 1 |
| Exam. 5 | 5 | Ni | 10.9 | 52.0 | 17.1 | 20 | 12 | 1 |
| Exam. 6 | 6 | Ni | 5.4 | 26.0 | 8.6 | 60 | 48 | 1 |
| Exam. 7 | 7 | Ni | 8.2 | 39.0 | 12.8 | 40 | 48 | 1 |
| Exam. 8 | 8 | Ni | 10.9 | 52.0 | 17.1 | 20 | 48 | 1 |
| Exam. 9 | 9 | Ni | 5.5 | 12.7 | 1.8 | 80 | 12 | 1 |
| Exam. 10 | 10 | Ni | 13.6 | 65.0 | 21.4 | — | 12 | 1 |
| Exam. 11 | 11 | Ni | 5.4 | 26.0 | 8.6 | 60 | 0.5 | 1 |
| Exam. 12 | 12 | Ni | 5.4 | 26.0 | 8.6 | 60 | 6 | 1 |
| Exam. 13 | 13 | Ni | 5.4 | 26.0 | 8.6 | 60 | 33 | 1 |
| Exam. 14 | 14 | Ni | 5.4 | 26.0 | 8.6 | 60 | 120 | 1 |
| Exam. 15 | 15 | Zr | 7.9 | 24.1 | 8.0 | 60 | 12 | 1 |
| Exam. 16 | 16 | Zr | 15.7 | 48.4 | 15.9 | 20 | 12 | 1 |
| Comp. Exam. 1 | 17 | — | — | 30.0 | 10.0 | 60 | 12 | 1 |
| Comp. Exam. 2 | 18 | Ni | 25.5 | 49.0 | 8.2 | 17.3 | 12 | 1 |
| Comp. Exam. 3 | 19 | Ni | 0.7 | 3.2 | 1.1 | 95 | 12 | 1 |

[*1]The amount added to 100 parts by mass of the total of a metal, silicon (Si), carbon(C) and α-SiC

TABLE 2

|  | Metal silicide Crystal phase | Metal silicide Content (mass %) | β-SiC Content (mass %) | β-SiC Particle diameter (μm) | Porosity (%) | Gas permeability coefficient ($\times 10^{-12}$ m²) | Thermal conductivity (W/mK) |
|---|---|---|---|---|---|---|---|
| Exam. 1 | $NiSi_2$ | 1 | 38 | 2 | 45 | 0.10 | 30 |
| Exam. 2 | $NiSi_2$ | 6 | 35 | 3 | 44 | 0.19 | 31 |
| Exam. 3 | $NiSi_2$ | 11 | 34 | 6 | 46 | 0.84 | 37 |
| Exam. 4 | $NiSi_2$ | 16 | 52 | 8 | 51 | 2.1 | 33 |
| Exam. 5 | $NiSi_2$ | 21 | 74 | 9 | 56 | 2.1 | 22 |
| Exam. 6 | $NiSi_2$ | 10 | 32 | 7 | 45 | 1.1 | 32 |
| Exam. 7 | $NiSi_2$ | 15 | 53 | 8 | 51 | 2.3 | 25 |
| Exam. 8 | $NiSi_2$ | 22 | 72 | 10 | 56 | 3.0 | 18 |
| Exam. 9 | $NiSi_2$ | 5 | 15 | 3 | 41 | 3.4 | 39 |
| Exam. 10 | $NiSi_2$ | 27 | 99 | 11 | 61 | 1.2 | 27 |
| Exam. 11 | $NiSi_2$ | 10 | 35 | 6 | 47 | 1.6 | 15 |
| Exam. 12 | $NiSi_2$ | 11 | 33 | 6 | 45 | 1.9 | 20 |
| Exam. 13 | $NiSi_2$ | 11 | 34 | 7 | 46 | 3.6 | 39 |
| Exam. 14 | $NiSi_2$ | 12 | 32 | 7 | 44 | 4.6 | 42 |
| Exam. 15 | $ZrSi_2$ | 13 | 31 | 8 | 43 | 1.0 | 19 |
| Exam. 16 | $ZrSi_2$ | 26 | 70 | 11 | 51 | 1.8 | 17 |
| Comp. Exam. 1 | Not present | 0 | 36 | 0.1 | 60 | 0.18 | 8 |
| Comp. Exam. 2 | $NiSi_2$ | 47 | 62 | 12 | 54 | 2.0 | 42 |
| Comp. Exam. 3 | $NiSi_2$ | 1 | 9 | 12 | 35 | 2.0 | 57 |

Example 17

An organic binder was added to the formulation of the batch No. 1 of Table 1, in an amount of 8% by mass to obtain a mixture. To the mixture was added an appropriate amount of water, followed by mixing and kneading, to obtain a kneaded clay having plasticity. The kneaded clay was subjected to extrusion, followed by drying, to obtain a honeycomb molded body having a partition wall thickness of 310 μm, a cell density of about 46.5 cells/cm$^2$ (300 cells/in$^2$), a section (normal to passage (cell)) shape of square of 35 mm×35 mm, and a total length of 152 mm. The honeycomb molded body was subjected to calcination in the air at 350° C. for 5 hours and then fired in an Ar inert atmosphere at about 1,450° C. to obtain a porous honeycomb structure (Example 7). In the honeycomb structure, the crystal phase of the metal silicide was one represented by a chemical formula $NiSi_2$ and its content was 1% by mass. The particle diameter of the β-SiC was 2 μm and the content of the β-SiC was 38% by mass when the total of α-SiC and β-SiC was taken as 100% by mass. The honeycomb structure further had a porosity of 56%, a gas permeability coefficient of $0.24 \times 10^{-12}$ m$^2$ and a thermal conductivity of 25 W/mK.

Examples 18 to 22

Porous honeycomb structures (Examples 18 to 22) were obtained in the same manner as in Example 17 except that there were used formulations shown in Table 3. In Table 3 are shown the kind and content of the metal silicide crystal phase in each honeycomb structure and the particle diameter and content of the β-SiC therein. In Table 3 are further shown the porosity, gas permeability coefficient and thermal conductivity of each honeycomb structure.

Example 23

To the formulation of the batch No. 1 of Table 1 were added a pore former in an amount of 5% by mass and an organic binder in an amount of 8% by mass, to obtain a mixture. Thereto was added an appropriate amount of water, followed by mixing and kneading, to produce a kneaded clay having plasticity. The kneaded clay was subjected to extrusion, followed by drying, to obtain a honeycomb molded body having a partition wall thickness of 310 μm, a cell density of about 46.5 cells/cm$^2$ (300 cells/in$^2$), a section (normal to passage (cell)) shape of square of 35 mm×35 mm, and a total length of 152 mm. Each cell of the honeycomb molded body was plugged at either end with the same material as used in the kneaded clay, so that the cells looked to be plugged alternately at each end face of the honeycomb molded body. The resulting molded body was dried, then subjected to calcination in the air at 350° C. for 5 hours, and fired in an Ar inert atmosphere at about 1,450° C., to obtain a porous honeycomb structure (a honeycomb segment). The honeycomb segment was coated at the outer surface with a bonding material (ceramic-based cement) to form a bonding material layer having a thickness of about 1 mm. On the bonding material layer formed was mounted another honeycomb segment. This operation was repeated to produce a laminated body comprising 16 (4×4) honeycomb segments. The laminated body was as necessary pressed for stronger bonding and then dried at 140° C. for 2 hours to obtain a bonded material. The outer periphery of the bonded material was subjected to cutting so as to give a cylindrical shape. The outer surface (cut surface) was coated with a coating material (the same ceramic-based cement as the bonding material) and dried at 700° C. for 2 hours for curing, to obtain a honeycomb structure (DPF) (Example 23).

In the DPF, the crystal phase of the metal silicide was one represented by a chemical formula $NiSi_2$ and its content was 1% by mass. The particle diameter of the β-SiC was 2 μm and the content of the β-SiC was 40% by mass when the total of α-SiC and β-SiC was taken as 100% by mass. The DPF further had a porosity of 59%, a gas permeability coefficient of $0.49 \times 10^{-12}$ m$^2$ and a thermal conductivity of 22 W/mK.

TABLE 3

| | Batch No. | Organic binder (Mass %) | Metal silicide Crystal phase | Metal silicide Content (Mass %) | β-SiC Content (Mass %) | β-SiC Particle diameter (μm) | Porosity (%) | Gas permeability coefficient (×10$^{-12}$ m$^2$) | Thermal conductivity (W/mK) |
|---|---|---|---|---|---|---|---|---|---|
| Exam. 17 | 1 | 8 | NiSi$_2$ | 1 | 38 | 2 | 56 | 0.24 | 25 |
| Exam. 18 | 2 | 8 | NiSi$_2$ | 6 | 36 | 3 | 57 | 0.45 | 26 |
| Exam. 19 | 3 | 8 | NiSi$_2$ | 10 | 36 | 6 | 58 | 1.1 | 32 |
| Exam. 20 | 6 | 8 | NiSi$_2$ | 12 | 34 | 7 | 60 | 3.1 | 27 |
| Exam. 21 | 7 | 8 | NiSi$_2$ | 16 | 52 | 8 | 62 | 5.2 | 20 |
| Exam. 22 | 8 | 8 | NiSi$_2$ | 20 | 72 | 10 | 66 | 7.1 | 13 |

Examples 24 to 29 and Comparative Example 4

DPFs (Examples 24 to 29 and Comparative Example 4) were obtained in the same manner as in Example 23 except that there were used formulations shown in Table 3. In Table 4 are shown the kind and content of the metal silicide crystal phase in each DPF and the particle diameter and content of the β-SiC therein. In Table 4 are further shown the porosity, gas permeability coefficient and thermal conductivity of each DPF.

TABLE 4

| | Batch No. | Pore former (Mass %) | Organic binder (Mass %) | Metal silicide Crystal phase | Metal silicide Content (Mass %) | β-SiC Content (Mass %) | β-SiC Particle diameter (μm) | Porosity (%) | Gas permeability coefficient (×$10^{-2}$ m$^2$) | Thermal conductivity (W/mK) |
|---|---|---|---|---|---|---|---|---|---|---|
| Exam. 23 | 1 | 5 | 8 | NiSi$_2$ | 1 | 40 | 2 | 59 | 0.49 | 22 |
| Exam. 24 | 2 | 5 | 8 | NiSi$_2$ | 6 | 37 | 4 | 60 | 0.85 | 23 |
| Exam. 25 | 3 | 5 | 8 | NiSi$_2$ | 10 | 35 | 6 | 61 | 2.7 | 29 |
| Exam. 26 | 6 | 5 | 8 | NiSi$_2$ | 11 | 34 | 8 | 64 | 9.1 | 24 |
| Exam. 27 | 7 | 5 | 8 | NiSi$_2$ | 16 | 51 | 9 | 66 | 12 | 17 |
| Exam. 28 | 8 | 5 | 8 | NiSi$_2$ | 22 | 77 | 10 | 70 | 36 | 10 |
| Exam. 29 | 8 | 10 | 8 | NiSi$_2$ | 21 | 75 | 10 | 78 | 38 | 6 |
| Comp. Exam. 4 | 8 | 20 | 8 | NiSi$_2$ | 21 | 76 | 9 | 85 | Measurement was impossible due to insufficient strength. | |

The followings are clear from the results of Table 2 to 4. The silicon carbide based porous material of Comparative Example 1, obtained by using no metal such as nickel (Ni) is high in porosity, but is low in gas permeability coefficient and insufficient in filter characteristics. On the other hand, the silicon carbide based porous materials of Examples 1 to 16, the honeycomb structures of Examples 17 to 22 and the DPFs of Examples 23 to 29, obtained by using a metal such as nickel (Ni) or zirconium (Zr) have a high porosity and a high gas permeability coefficient and have excellent filter characteristics. Further, these silicon carbide based porous materials, honeycomb structures and DPFs have a high thermal conductivity and accordingly are expected to be low in the thermal stress generating in burning of accumulated soot.

The silicon carbide based porous material of the present invention is suitably used as a material for various filters including a filter for purification for diesel exhaust gas such as diesel particulate filter (DPF).

The invention claimed is:

1. A silicon carbide containing porous material containing α-SiC and β-SiC, wherein the proportion of the β-SiC to the total of the α-SiC and the β-SiC is 5 to 100% by mass, and
    a metal silicide in an amount of 1 to 30% by mass and having a porosity of 38 to 80%, wherein the metal silicide is NiSi$_2$ or ZrSi$_2$.

2. The silicon carbide containing porous material according to claim 1, wherein at least part of the β-SiC is particles having a particle diameter of 0.5 μm or more.

3. The silicon carbide containing porous material according to claim 1, which has a gas permeation coefficient of $1 \times 10^{-13}$ to $1 \times 10^{-10}$ m$^2$.

4. The silicon carbide containing porous material according to claim 1, wherein the NiSi$_2$ is present in an amount of 1 to 30% by mass.

5. The silicon carbide containing porous material according to claim 1, which has a thermal conductivity of 10 to 50 W/mK.

6. A honeycomb structure made of a silicon carbide containing porous material according to claim 1, which has a plurality of cells formed by being divided by partition walls.

7. The honeycomb structure according to claim 6, which is used as a filter for purification of diesel exhaust gas.

8. The honeycomb structure according to claim 7, which is made by bonding a plurality of honeycomb segments having said cells and wherein each cell is plugged at either end so that the cells look like being plugged alternately, at each end face of the honeycomb structure.

9. The silicon carbide containing porous material according to claim 1, wherein the ZrSi$_2$ is present in an amount of 1 to 30% by mass.

10. The silicon carbide containing porous material according to claim 1, wherein the proportion of the β-SiC to the total of the α-SiC and the β-SiC is 10 to 80% by mass.

11. The silicon carbide containing porous material according to claim 1, wherein the proportion of the β-SiC to the total of the α-SiC and the β-SiC is 15 to 50% by mass.

12. A method for preparation of a silicon carbide containing porous material, which comprises forming a raw materials mixture containing a metal, silicon and carbon, into a predetermined shape, followed by resin removal and firing, to obtain a silicon carbide containing porous material containing
    α-SiC and β-SiC, wherein the proportion of the β-SiC to the total of the α-SiC and the β-SiC is 5 to 100% by mass, and
    a metal silicide in an amount of 1 to 30% by mass and a having a porosity of 38 to 80%, wherein the metal silicide is NiSi$_2$ or ZrSi$_2$.

13. The method for preparation of a silicon carbide containing porous material according to claim 12, wherein the raw materials mixture further contains an α-SiC raw material.

14. The method for preparation of a silicon carbide containing porous material according to claim 12, wherein the firing is conducted at 1,250 to 1,800° C.

15. The method for preparation of a silicon carbide containing porous material according to claim 12, wherein the α-SiC raw material has an average particle diameter of 5 to 100 μm.

16. The method for preparation of a silicon carbide containing porous material according to claim 12, wherein the raw materials mixture is formed into a honeycomb shape having a plurality of cells divided by partition walls.

* * * * *